US011068362B2

(12) United States Patent
Xie et al.

(10) Patent No.: US 11,068,362 B2
(45) Date of Patent: *Jul. 20, 2021

(54) HIGH-AVAILABILITY CLUSTER ARCHITECTURE AND PROTOCOL

(71) Applicant: Fortinet, Inc., Sunnyvale, CA (US)

(72) Inventors: Michael Xie, Palo Alto, CA (US); Jingyu Liu, Coquitlam (CA); Xianfeng Deng, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 235 days.

This patent is subject to a terminal disclaimer.

(21) Appl. No.: 15/965,141

(22) Filed: Apr. 27, 2018

(65) Prior Publication Data

US 2018/0246791 A1  Aug. 30, 2018

Related U.S. Application Data

(63) Continuation of application No. 15/600,750, filed on May 21, 2017, now Pat. No. 9,965,368, which is a
(Continued)

(51) Int. Cl.
*G06F 11/20* (2006.01)

(52) U.S. Cl.
CPC ...... *G06F 11/2033* (2013.01); *G06F 11/2005* (2013.01); *G06F 11/2007* (2013.01); *G06F 11/2023* (2013.01); *G06F 2201/805* (2013.01)

(58) Field of Classification Search
CPC ............. G06F 11/2033; G06F 11/2023; G06F 11/2007; G06F 11/2005; G06F 2201/805
(Continued)

(56) References Cited

U.S. PATENT DOCUMENTS 6,032,194 A   2/2000  Gai et al.
6,308,281 B1  10/2001 Hall et al.
(Continued)

OTHER PUBLICATIONS

Wikipedia "internet security" p. from date Jan. 31, 2013, retrieved using the WayBackMachine, from https://web.archive.org/web/20130131191821/https://en.wikipedia.org/wiki/Internet_security. (Year: 2013).*

(Continued)

*Primary Examiner* — Yair Leibovich
(74) *Attorney, Agent, or Firm* — HDC Intellectual Property Law, LLP

(57) ABSTRACT

Methods and systems are provided for an improved cluster-based network architecture. According to one embodiment, an active connection is established between a first interface of a network device and an enabled interface of a first cluster unit of an HA cluster of network security devices. The HA cluster is configured to provide connectivity between network devices of an internal and external network. A backup connection is established between a second interface of the network device and a disabled interface of a second cluster unit. While the first cluster unit is operational and has connectivity, it receives and processes all network traffic from the network device that is destined for the external network. Upon determining the first cluster unit has failed or has lost connectivity, then all subsequent network traffic originated by the network device that is destined for the external network is directed to the second cluster unit.

18 Claims, 6 Drawing Sheets

Related U.S. Application Data continuation of application No. 14/817,163, filed on Aug. 3, 2015, now Pat. No. 9,934,112, which is a continuation of application No. 13/787,020, filed on Mar. 6, 2013, now abandoned.

(58) Field of Classification Search
USPC ........................................................ 714/4.12
See application file for complete search history.

(56) References Cited

U.S. PATENT DOCUMENTS

| | | | |
|---|---|---|---|
| 6,366,558 | B1 | 4/2002 | Howes et al. |
| 6,385,197 | B1 | 5/2002 | Sugihara |
| 6,621,788 | B1 | 9/2003 | Terasaki |
| 6,678,241 | B1 | 1/2004 | Gai et al. |
| 6,792,463 | B1 | 9/2004 | Lamberton et al. |
| 6,888,792 | B2 | 3/2005 | Gronke |
| 7,039,828 | B1 | 5/2006 | Scott |
| 7,469,279 | B1 * | 12/2008 | Stamler ............... H04L 41/0672 709/220 |
| 7,593,346 | B2 * | 9/2009 | McLaggan ............. H04L 45/00 370/252 |
| 8,145,788 | B1 | 3/2012 | Love et al. |
| 8,209,403 | B2 | 6/2012 | Szabo et al. |
| 8,209,405 | B1 | 6/2012 | Trivedi |
| 8,830,874 | B2 | 9/2014 | Cho et al. |
| 9,141,625 | B1 | 9/2015 | Thornewell |
| 9,934,112 | B2 | 4/2018 | Xie et al. |
| 9,965,368 | B2 | 5/2018 | Xie et al. |
| 2002/0071386 | A1 | 6/2002 | Gronke |
| 2003/0033412 | A1 | 2/2003 | Sundaresan |
| 2005/0027862 | A1 * | 2/2005 | Nguyen ................ G06F 9/505 709/225 |
| 2005/0071470 | A1 | 3/2005 | O'Brien et al. |
| 2006/0101201 | A1 | 5/2006 | Vageline |
| 2006/0168084 | A1 * | 7/2006 | Kogan .................... H04L 45/00 709/207 |
| 2007/0174660 | A1 | 7/2007 | Peddada |
| 2008/0281938 | A1 | 11/2008 | Rai |
| 2009/0225763 | A1 | 9/2009 | Forsberg |
| 2010/0011244 | A1 | 1/2010 | Mohamed-Rasheed |
| 2010/0042869 | A1 | 2/2010 | Szabo et al. |
| 2012/0254654 | A1 | 10/2012 | Blinick et al. |
| 2013/0111261 | A1 | 5/2013 | Dalton |
| 2013/0212373 | A1 | 8/2013 | Dodgson et al. |
| 2013/0227359 | A1 | 8/2013 | Butterworth |
| 2014/0047263 | A1 | 2/2014 | Coatney et al. |
| 2014/0258771 | A1 | 9/2014 | Xie et al. |
| 2017/0039117 | A1 | 2/2017 | Xie et al. |
| 2017/0255532 | A1 | 9/2017 | Xie et al. |

OTHER PUBLICATIONS

Non-Final Rejection for U.S. Appl. No. 13/787,020 dated Apr. 6, 2015.

Final Rejection for U.S. Appl. No. 13/787,020 dated Nov. 5, 2015.

Non-Final Rejection for U.S. Appl. No. 14/817,163 dated Mar. 30, 2017.

Notice of Allowance for U.S. Appl. No. 14/817,163 dated Dec. 1, 2017.

Notice of Allowance for U.S. Appl. No. 15/600,750 dated Feb. 2, 2018.

\* cited by examiner

HIGH-AVAILABILITY CLUSTER ARCHITECTURE AND PROTOCOL

CROSS-REFERENCE TO RELATED APPLICATIONS

This application is a continuation of U.S. patent application Ser. No. 15/600,750, filed May 21, 2017, now U.S. Pat. No. 9,965,368, which is a continuation of U.S. patent application Ser. No. 14/817,163, filed Mar. 30, 2017, now U.S. Pat. No. 9,934,112, which is a continuation of U.S. patent application Ser. No. 13/787,020, filed Mar. 6, 2013, now abandoned, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013-2018, Fortinet, Inc.

BACKGROUND

Field

Embodiments of the present invention generally relate to the field of computer networks. In particular, various embodiments relate to methods and systems for an improved cluster-based network architecture that enable efficient load balancing and failover protection between units of a cluster.

Description of the Related Art

In the field of distributed computing, two or more computing resources are generally used to perform various tasks such as traffic management, synchronization, load balancing, and failover, among other such tasks. These grouped resources generally form a computing environment and are often referred to as "computing clusters" or simply "clusters". A cluster typically includes computers or processors, networks or communication links for data transfer, databases, and other devices such as routers or gateways that are configured to allow load balancing, high availability (HA), better connectivity, high performance, and failover procedures to ensure smooth flow of traffic across the network.

A HA cluster can include two or more units, commonly referred to as cluster units, which are configured to enable high availability operation, protect against one single point of failure, and recognize or detect faults in a system's hardware or software application. Such cluster units can either be of same model and same hardware configuration (for instance, same AMC modules installed in same slots, same number of hard disks and so on) and running in the same operating mode (NAT/Route mode or Transparent mode) or can have different configurations and device settings.

In a typical operation of a high-availability cluster, on startup, after cluster units have been configured with same HA settings, cluster units find other cluster units for HA operation and negotiate with each other to create a cluster. During cluster operation, cluster units, running on a common protocol, share communication and synchronization information among themselves, where the cluster units communicate with each other using network interfaces present in each cluster unit. Common cluster units include standalone gateways, routers, switches, and the like.

High availability (HA) cluster is generally operated in two modes: Active-passive HA (failover protection) and Active-active HA (load balancing and failover protection). Active-passive HA cluster provides standby failover protection and includes a primary or master cluster unit that processes communication sessions and one or more subordinate or slave cluster units. Subordinate or slave cluster units are connected to the network and to primary or master cluster unit but do not process communication sessions, and instead run in a standby state. In standby state, primary or master cluster unit stores configuration data and routing data in subordinate or slave cluster unit to synchronize with subordinate slave cluster units. If master cluster unit fails in active-passive HA cluster, one of subordinate or slave cluster unit immediately takes its place. Active-passive HA cluster also provides transparent link failover among cluster units.

Active-active HA cluster, on the other hand, includes a primary or master unit and one or more subordinate or slave cluster units, wherein master cluster unit receives all communication sessions and load balances them between itself and all subordinate or slave cluster units. In an active-active cluster, subordinate units are also active since they also process sessions from network devices connected to HA cluster.

FIG. 1 illustrates an exemplary prior art cluster-based network architecture 100. Network 100 includes a plurality of computing devices 102a, 102b, 102c, . . . 102n, collectively referred to as computing devices 102 hereinafter, where such computing devices 102 can include one or more of a mobile device, smart device, tablet PC, web-enabled device, among other such devices that can be operatively coupled to a network. Computing devices 102 are connected to a local area network, wherein the local area network can be a wired or wireless network. Local area network (LAN) can be connected to an internal switch 104 that is configured to handle traffic entering and/or leaving the LAN. In operation, traffic from internal switch 104 is sent to a HA cluster, wherein the HA cluster includes multiple cluster units 106 having at least one master cluster unit 106a and a slave cluster 106b. The master cluster unit 106a processes communication sessions received from computing devices 102 and the slave cluster unit 106b stores session information of the master cluster 106a. HA cluster is connected to an external switch 108, which in turn is connected to a router 110 that controls all traffic entering and leaving the HA cluster. Router 110 is connected to Internet 112 or an external network 112 to enable computing device 102 to access the Internet 112 or the external network 112.

When HA cluster of FIG. 1 is operated in active-passive HA cluster mode, master cluster unit 106a processes all communication sessions from computing devices 102 and synchronizes slave cluster unit 106b to store session information processed by master cluster unit 106a. Master cluster unit 106a receives data or traffic from computing devices 102 through internal switch 104 and passes the data through to external switch 108 after processing the data. Information regarding processed data is stored in slave cluster unit 106b. When master cluster unit 106a fails, data processing and transmission comes to a halt and slave cluster unit 106b is declared as a new master cluster unit and the newly assigned master cluster unit 106b starts processing traffic from or to the computing devices 102.

On the other hand, when HA cluster, as described above in FIG. 1, is implemented in an active-active HA cluster mode, master cluster unit 106a operates in its normal master mode to process traffic from one or more computing devices 102 and assigns one or more of other computing devices 102 to slave cluster unit 106b and can further store session information in slave cluster unit 106b. In this mode therefore, slave cluster unit 106b also processes one or more computing devices 102 assigned to it by master cluster unit 106a. In operation, when master cluster unit 106a fails, one of the slave cluster units 106b is selected as a new master cluster unit and starts processing the traffic and other configuration information from computing devices 102 that were assigned to earlier master unit 106a.

Existing cluster architectures require a master-slave configuration, which, apart from creating other inefficiencies, demands all network devices to be connected to the master cluster unit, thereby increasing the load on the master unit and not allowing balancing of load on all cluster units. For instance, in traditional active-active configuration, all traffic is first sent to master cluster unit and then the master unit redirects the packets to slave cluster units if the corresponding network session is on the slave cluster units. Further, in an active-passive HA cluster mode, as computing devices in a network are connected to a single master cluster unit that manages data traffic, when the master cluster unit fails, there exists no other master cluster unit, and a delay is created before the slave cluster unit is assigned the role of a master cluster unit, leading to a potential loss of data or other relevant configuration information. Active-active HA cluster mode method also faces similar problems as of active-passive HA cluster mode method as the process of selecting and assigning new primary cluster unit takes time and creates load balancing issues in the cluster. Furthermore, existing architectures require slave cluster units to re-learn IP/MAC addresses after every failover, which again creates inefficiencies and delay.

In view of existing mechanisms of failover protection and load balancing in high-availability clusters having multiple cluster units, there exists a need for methods and systems that can provide failover protection and load balancing in high-availability clusters.

SUMMARY

Methods and systems are described for an improved architecture and design of high-availability clusters enabling efficient load balancing and failover protection between units of a cluster. Methods and systems are also described for connecting network devices with cluster units such that load from network devices is balanced across cluster units and failover provisions allow efficient allocation and sharing of cluster unit resources. Network devices can include routers, switches, or access points that allow routing or flow management of traffic and can even include client computing or web-enabled devices such as personal computer or laptops that are directly/indirectly connected with cluster units. Cluster units, on the other hand, can include routers, gateways, servers, among other such devices that support synchronization of content across cluster and ensure continuity of traffic flow to and from the Internet.

According to one embodiment, an active connection is established between a first interface of a network device that is configured in an internal network and an enabled interface of a first cluster unit of a high availability cluster of network security devices (HA cluster). The HA cluster is configured to provide connectivity between network devices of the internal and external networks, such as the Internet or an Intranet of another organization. A backup connection is established between a second interface of the network device and a disabled interface of a second cluster unit of the HA cluster. While the first cluster unit remains in an operational state and has connectivity to the external network, the first cluster unit receives and processes via the active connection all network traffic from the network device that is to be transmitted onto the external network. Upon determining the first cluster unit is in a failed state or the first cluster unit does not have connectivity to the external network, then all subsequent network traffic from the network device that is to be transmitted onto the external network is caused to be received and processed by the second cluster unit via the backup connection by enabling the disabled interface of the second cluster unit and disabling the enabled interface of the first cluster unit.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
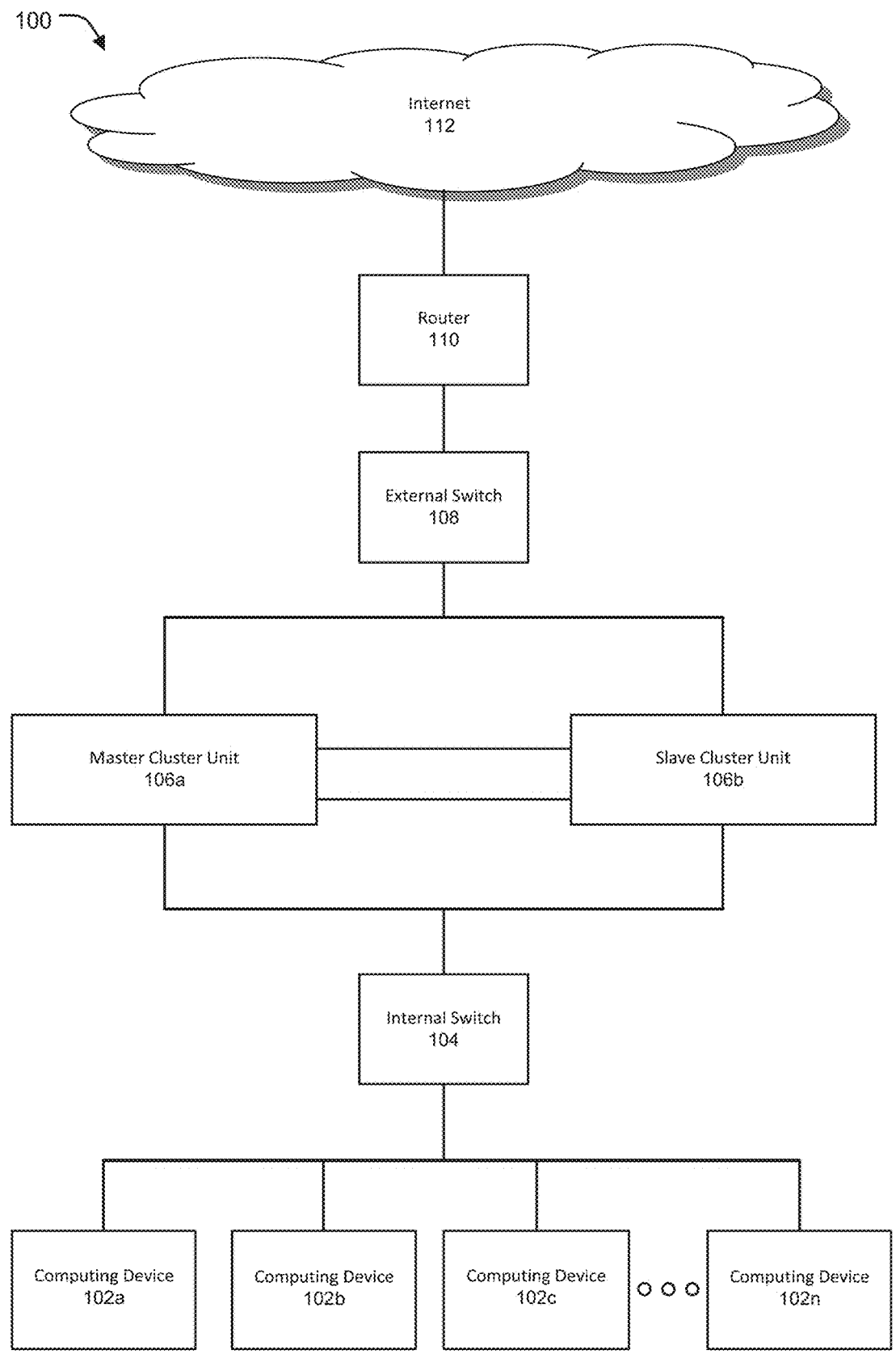
FIG. 1 illustrates an exemplary prior art cluster-based network architecture.

Embodiments of the present invention generally relate to methods and systems for improved cluster-based network architecture that enables efficient load balancing and failover protection between units of a cluster. The present disclosure relates to an architecture that allows a novel configuration setup between cluster units of a high availability (HA) cluster and network devices that intend to access external networks. As the architecture is not master-slave based, the proposed system and method allow seamless transition across cluster units, load balancing, no packet or session data loss, among other advantages.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of conducting network auditing, it should be appreciated that the same has been done merely to illustrate the invention in an exemplary manner and any other purpose or function for which the explained structure or configuration can be used, is covered within the scope o the present disclosure.

Figure 2:
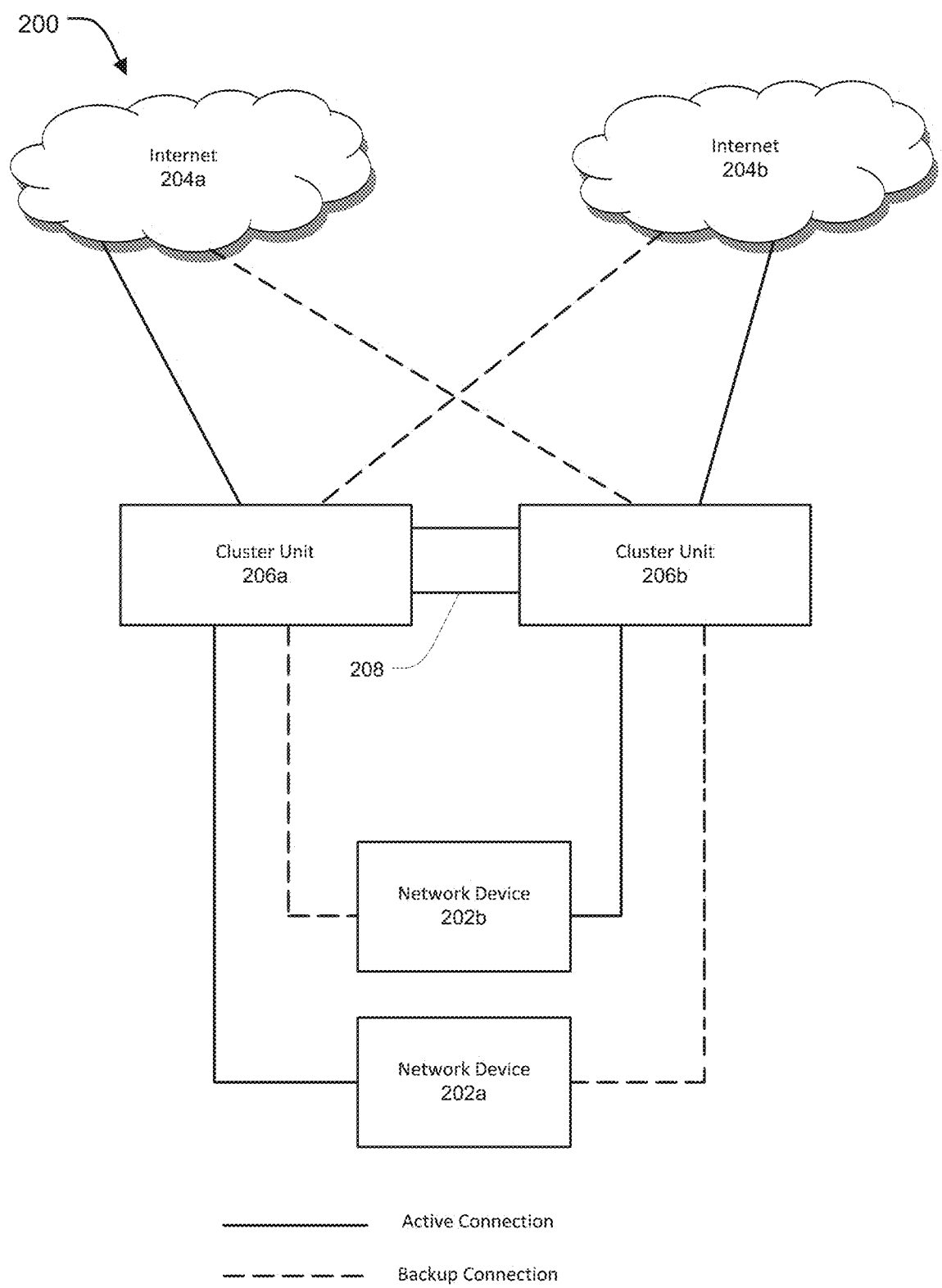
FIG. 2 illustrates a cluster-based network architecture in accordance with an embodiment of the present invention.

Embodiments of present disclosure and their advantages are best understood by reference to FIG. 2. FIG. 2 illustrates a cluster-based network architecture system 200 in accordance with an embodiment of the present invention.

According to one embodiment, system 200 includes one or more network devices 202a and 202b, collectively referred to as network devices 202 hereinafter, configured to access or process packets, content, information, and data from external networks such as Extranet, Intranet, and Internet 204a and 204b, among other such external networks, collectively referred to as Internet or external network 204 hereinafter. Network devices 202 can include routers, switches, hubs, or access points that allow routing or flow management of traffic and can even include client computing or web-enabled devices such as personal computer, smart devices, or laptops that are directly/indirectly connected with external networks through networking devices. Each network device 202 has two or more communication interface devices or ports through which each device 202 can be operatively or physically coupled with desired resources.

According to one embodiment, network devices 202 are configured to access external networks 204 through one or more cluster units 206a and 206b, collectively referred to as cluster units 206. Cluster units 206 can form part of a high availability (HA) cluster that can comprise multiple such cluster units and can include routers, gateways, servers, among other such devices that support synchronization of content across clusters and ensure continuity of traffic flow to and from internet. Each cluster unit 206 has two or more communication interface devices or ports through which each unit 206 can be operatively or physically coupled with network devices 202 or other desired resources. According to one embodiment, each pair of cluster units 206 can be connected through dual high availability (HA) links for efficient bidirectional switching between the units. HA links allow heartbeat and communication between the cluster units 206 so that one unit can take over the ongoing sessions currently being handled by the other unit immediately after the failure.

According to one embodiment, apart from the illustrated architecture of network devices 202 connected with external network 204 through cluster units 206, many other resources and possible combinations can be possible to enable a strong network architecture to be created by inclusion of elements such as firewalls, gateway security devices, among other such elements. For instance, network 204 can be connected via wired or wireless connections to a local area network (LAN) to access external network 204 through a common interface. LAN, in conjunction to being connected to cluster units 206 and HA cluster, may be connected to routing devices such as routers, switches, among other such network devices, which help route or manage traffic flowing from LAN to the Internet/External network 204.

According to one embodiment, each cluster unit 206 is operatively connected to external network or Internet 204 through its respective connection. For instance, cluster unit 206a is (as indicated through straight line) operatively coupled to Internet 204a and cluster unit 206b is operatively coupled to Internet 204b, wherein the Internet 204a and 204b can include same or different network connections, configurations, content or information access, retrieving and transmission means, rights, or other network attributes. On similar lines, based on the network configuration, cluster unit 206a can be connected with external network 204b and cluster unit 206b can be connected with external network 204a.

According to one embodiment, network devices 202 form part of one or more internal networks, wherein each internal network can be defined by their configuration, rights, and other structural settings. Each network device 202 can be configured such that it establishes an active connection through say its first interface with an enabled interface of one of the cluster units 206 and establishes a backup connection through say its second interface with a disabled interface of another cluster unit 206. For instance, as shown in FIG. 2, network device 202a can be configured to form an active connection through one of its ports or connection interface devices with an enabled interface of cluster unit 206a (shown through a solid line) and can be further configured to form a backup connection through another port or communication interface device with a disabled interface of cluster unit 206b (shown through a dotted line).

According to one embodiment, network device 202a continues to receive and process packets for external network 204a through its respective active connection till the time the first cluster unit 206a remains operational and has connectivity to external network 204. Cluster units can fail due to multiple reasons including failure of components, traffic load, network outrage, among other such reasons. However, when first cluster unit 206a fails or unit 206a does not have connectivity to external network 204a, disabled interface of second cluster unit 206b is enabled and backup connection of unit 206b is used causing all subsequent packets originated by network device 202a to be transmitted onto external network 204a to be received and processed by second cluster unit 206b. In such a case, cluster unit 206b can create a relationship with internet or external network 204a and transmit or receive packets between network device 202a and external network 204a. Once the disabled interface of second cluster unit 206b is enabled, previously enabled interface of first cluster unit 206a can be disabled.

According to one embodiment, when cluster unit 206a regains operations or is able to access external network 204a, the then disabled interface of cluster unit 206a is enabled and device 202a automatically starts sending or receiving traffic to/from Internet 204a by disabling the interface of cluster unit 206b. It would be appreciated that disabling interface of first cluster unit 206a during the initial switching from unit 206a to 206b itself is not necessary and any other means can be employed to allow the backup connection of cluster unit 206b to be used after failover of unit 206a. Smooth transfer of sessions and data transfer settings between cluster units 206a and 206b is enabled through HA link(s) 208 between the cluster units.

On similar lines, according to one embodiment, network device 202b can be configured to form an active connection through one of its ports or connection interface devices with an enabled interface of cluster unit 206b (shown through a solid line) and can be further configured to form a backup connection through another port or communication interface device with a disabled interface of cluster unit 206a (shown through a dotted line).

According to one embodiment, network device 202b continues to receive and process traffic for external network 204b through its respective active connection till the time the second cluster unit 206b remains operational and has connectivity to external network 204. However, when first cluster unit 206b fails or unit 206b does not have connectivity to external network 204b, the disabled interface of first cluster unit 206a is enabled and backup connection of unit 206a is used causing all subsequent traffic originated by network device 202b to be transmitted onto external network 204b to be received and processed by first cluster unit 206a. In such a case, first cluster unit 206a can create a relationship with internet or external network 204b and transmit or receive data/content between device 202b and external network 204b. Once the disabled interface of first cluster unit 206a is enabled, previously enabled interface of second cluster unit 206b can be disabled.

According to one embodiment, when cluster unit 206b regains operations or is able to access external network 204b, the then disabled interface of cluster unit 206b can be enabled and device 202b can automatically starts sending or receiving traffic to/from Internet 204b by disabling the interface of cluster unit 206a.

According to one embodiment, in each HA cluster, one cluster unit 206 can be configured as a master unit 206 and can be enabled to cause configuration settings of other cluster units 206 of HA cluster to be synchronized with configuration settings of the master unit. Furthermore, as the present disclosure does not follow a master-slave configuration between cluster units by allowing each cluster unit 206 to have active and backup connections so that they directly receive traffic from network devices 202, the structure and network construction of the present disclosure significantly improves the efficiency of traffic flow and allows desired load balancing. Master cluster unit, as disclosed above in this embodiment, can be configured to monitor and change the configuration settings of each cluster unit such that active and backup connections can be created and managed effectively.

According to another embodiment, as failure of cluster units 206 needs immediate transition of traffic flow for network devices 202 through cluster units having backup connections, system and architecture of the present disclosure can be configured to synchronize runtime information among the plurality of cluster units 206. Synchronization between cluster units 206 through HA link(s) 208 between the cluster units allows smooth transition of traffic flow and minimizes loss of content, packets, or sessions, among other such network information. Synchronization between cluster units 206 becomes even more important during a state change of any member having an impact on network settings, authentication server configurations, authorization group configurations, user bookmarks, persistent user cookies, persistent user passwords, user Secure Access Service session cookie, transient user profile information, among other cluster attributes.

According to one embodiment, for network device 202a, enabled interface of first cluster unit 206a and disabled interface of second cluster unit 206b share a single virtual Media Access Control (MAC) and virtual Internet Protocol (IP) address so as to make switching between active and backup connections seamless. Similarly, for network device 202b, enabled interface of second cluster unit 206b and disabled interface of first cluster unit 206a share a single virtual MAC and virtual IP address to allow efficient switching for network device 202b.

It would be appreciated that even though the present disclosure has been explained with respect to two network devices operatively connected with two cluster units, scope of the present disclosure would encompass multiple network devices connected with a plurality of cluster units. In an embodiment, a first network device has an active connection with a first cluster unit and a backup connection with a second cluster unit. Similarly, a second network device has an active connection with a third cluster unit and a backup connection with a fourth cluster unit such that when the first cluster unit fails, backup connection of second cluster unit is activated and when third cluster unit fails, backup connection of fourth cluster unit is activated.

According to one embodiment, as each network device of the present disclosure has two or more interfaces, need of an internal switch in the present network architecture does not exist and the devices can directly be coupled with the cluster units.

Figure 3A:
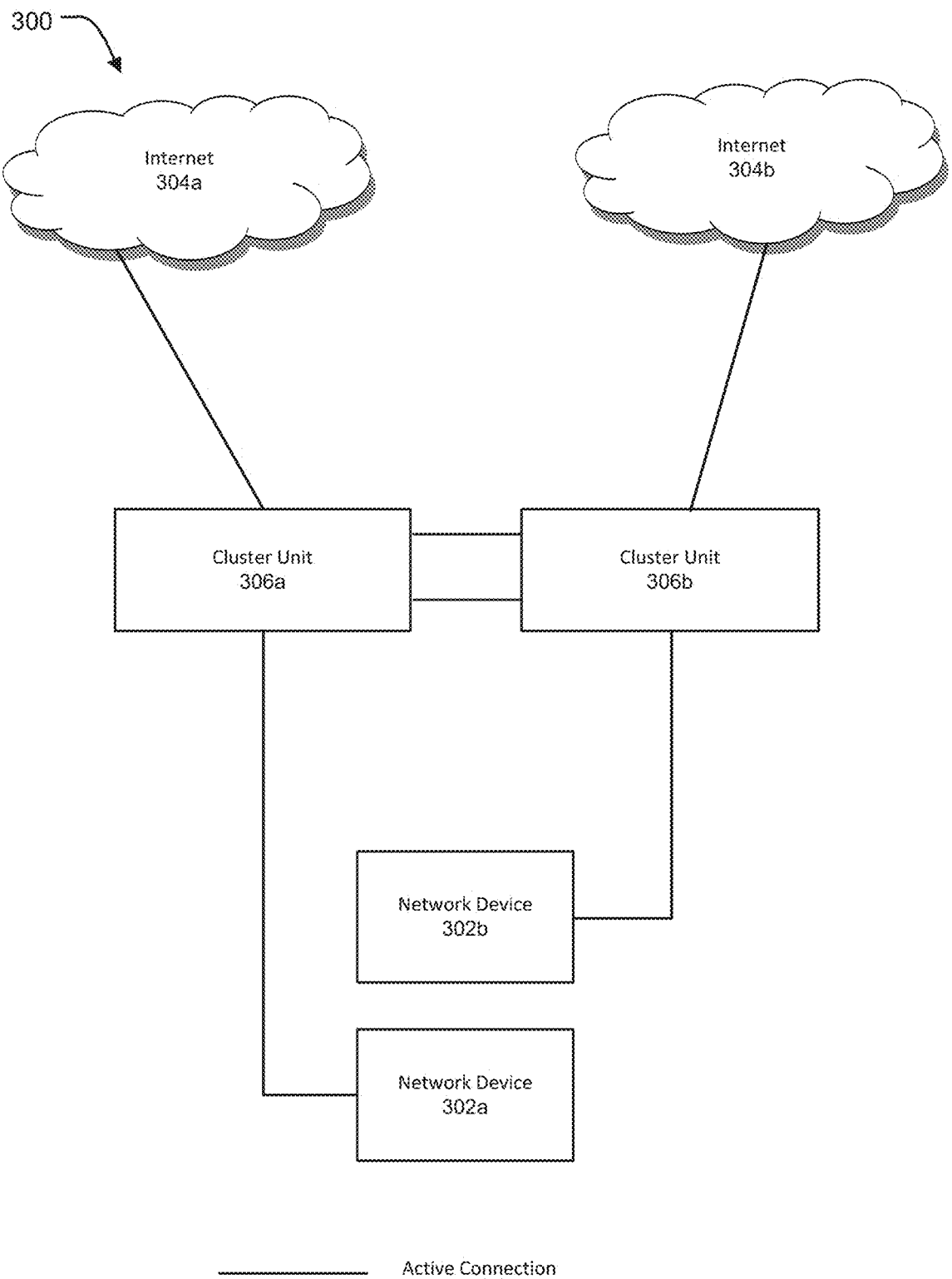
FIGS. 3A-3C illustrate a failover procedure in a proposed cluster based network architecture in accordance with an embodiment of the present invention.
Figure 3B:
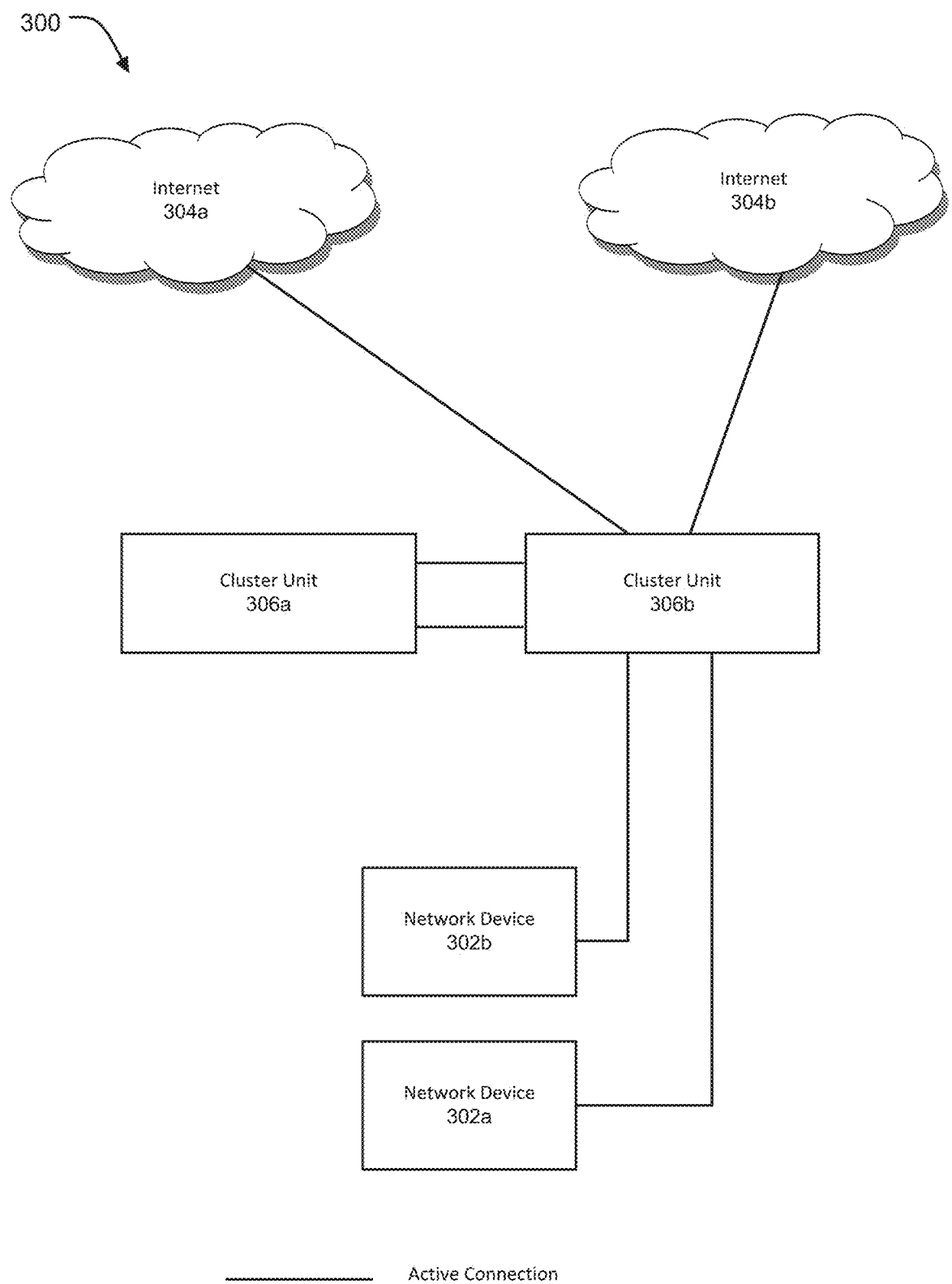
Figure 3C:
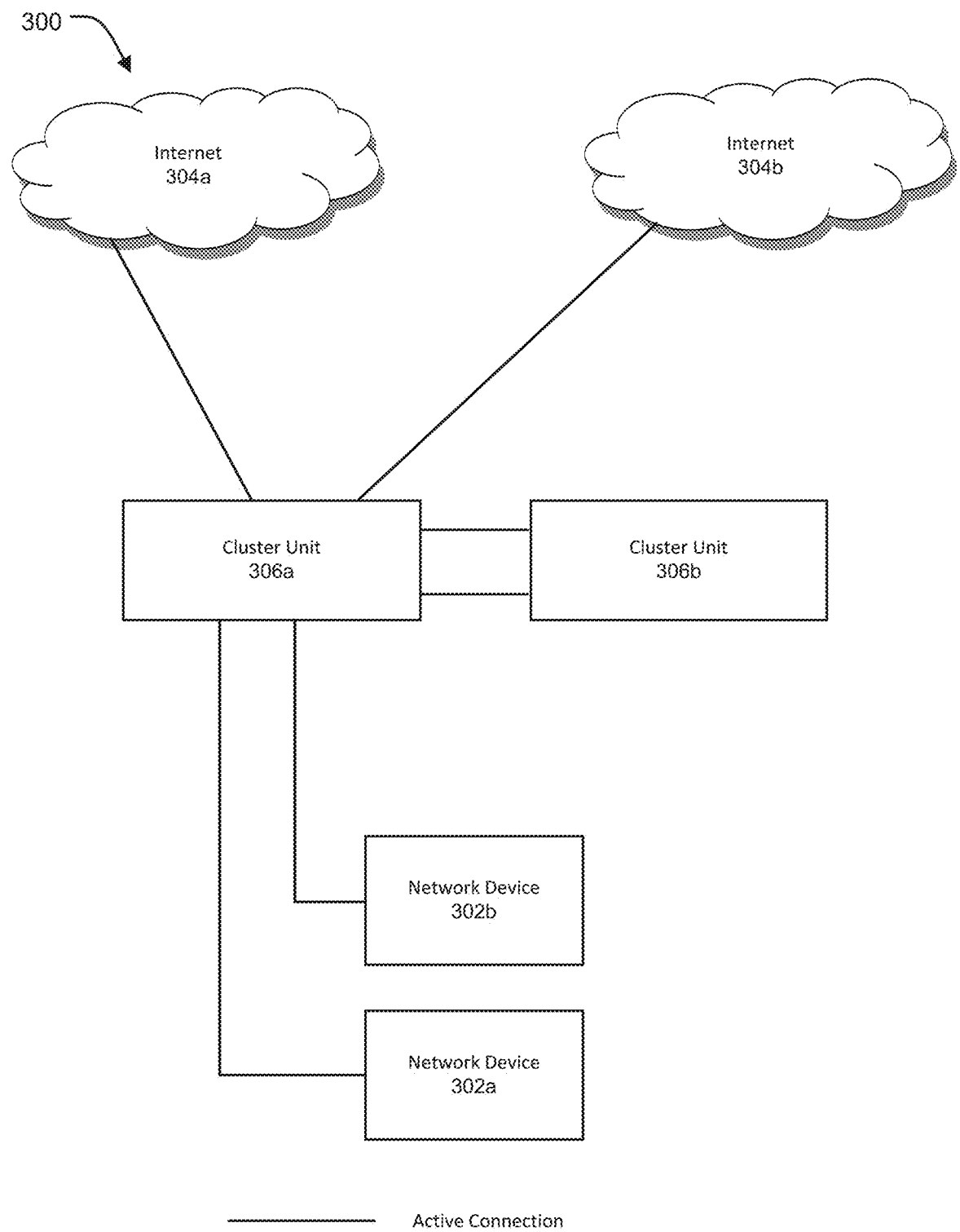

FIGS. 3A-3C illustrate a failover procedure 300 in a proposed cluster based network architecture in accordance with an embodiment of the present invention. FIG. 3A presents the failover procedure 300 with respect to the initial setup between the network device and the cluster unit as shown in FIG. 2 without showing backup connections and only displaying currently active connections. As shown in FIG. 3A, network device 302a initially has an active connection with cluster unit 306a to access external network 304a and has a backup connection (not shown) with a disabled interface of cluster unit 306b. Network device 302b, on the other hand, has an active connection with cluster unit 306b to access external network 304b and has a backup connection (not shown) with a disabled interface of cluster unit 306a.

FIG. 3B shows failover of network device 302a. In FIG. 3B, when cluster unit 306a fails or is not able to connect with Internet or external network 304a, disabled interface of second cluster unit 306b is enabled and backup connection is established between network device 302a and second cluster unit 306b. In this process, earlier enabled or active interface of first cluster unit 306a is disabled until first cluster unit 306a regains its operations or establishes connection with external network 304a. Further, in this process, cluster unit 306b establishes connection with external network 304a to allow network device 302a to access network 304a through cluster unit 306b.

FIG. 3C shows failover of network device 302b. This step assumes that active connection for network device 302a has regained connection and device 302a is connected with cluster unit 306a. In FIG. 3C, when cluster unit 306b fails or is not able to connect with Internet or external network 304b, disabled interface of first cluster unit 306a is enabled and backup connection is established between network device 302b and first cluster unit 306a. In this process, earlier enabled or active interface of second cluster unit 306b can be disabled until second cluster unit 306b regains its operations or establishes connection with external network 304b. Further, in this process, cluster unit 306a establishes connection with external network 304b to allow network device 302b to access network 304b through cluster unit 306a.

Figure 4:
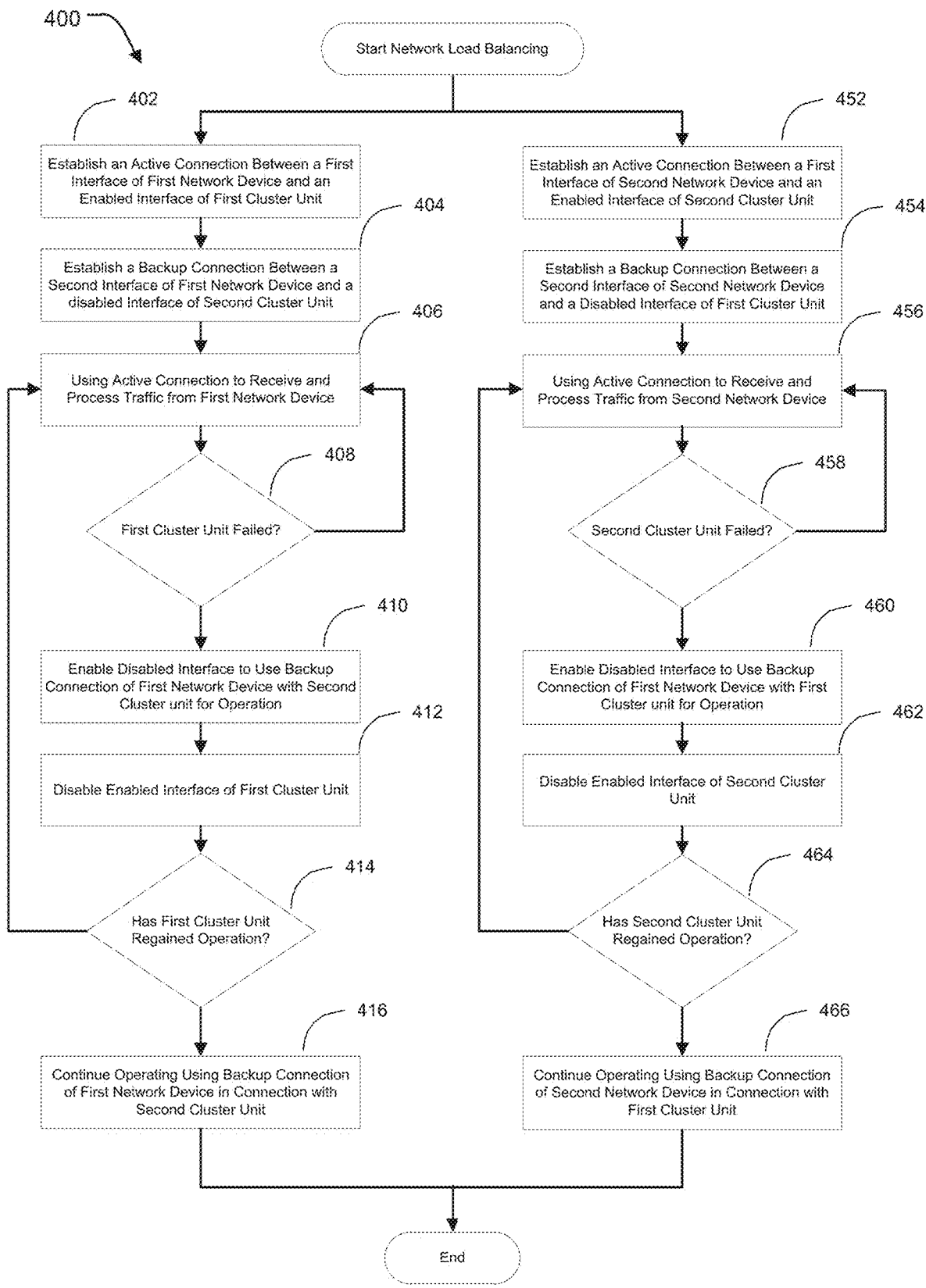
FIG. 4 is a flow diagram illustrating failover processing in proposed cluster based network architecture in accordance with an embodiment of the present invention.

FIG. 4 depicts a flow diagram 400 illustrating a method for efficiently creating and managing a cluster-based network architecture enabling efficient load balancing and failover protection across units of a high availability (HA) cluster in accordance with an embodiment of the present invention. It should be appreciated that although the proposed method can be executed for a single network device having connections with two or more cluster units, for illustration purposes the flow chart 400 demonstrates the use of the proposed network architecture using two network devices and two cluster units. The flow chart 400 can therefore start at step 402 and/or at step 452. At step 402, an active connection can be established between a first interface of a first network device within an internal network and an enabled interface of a first cluster unit of a high-availability (HA) cluster, wherein the HA cluster provides the internal network with connectivity to an external network. Network device can be any of, but not limited to, a router, a switch, a gateway, a bridge and can include personal computers, laptops, tablets, and like computing devices. As discussed above, each network device and cluster unit can include two or more communication interface devices or ports that allow multiple connections for each network device and cluster unit. An active connection can be configured to receive and/or transmit data from first network device to external network through the respective cluster unit.

At step 404, a backup connection is established between a second interface of first network device and a disabled interface of a second cluster unit of the HA cluster. Second cluster unit from HA cluster can be selected from among a plurality of cluster units of the HA cluster and a connection can be established between one of the interfaces of second cluster unit and second interface of first network device, wherein the chosen interface of second cluster unit is disabled. Being a backup connection, any traffic coming from or to the first network device would not be routed through second cluster unit unless first cluster unit fails or is not able to establish relationship with external network. In operation, runtime information of first network device can be synchronized by the first cluster unit with second cluster unit having backup connection through HA link(s) between the cluster units so that heartbeat and session synchronization remains.

At step 406, first network device continues to use the active connection with first cluster unit for receiving and processing traffic originated by first network device for transmission onto external network. Enabled interface of first cluster unit can start receiving traffic from first interface of first network device and process data of first network device. Similarly, first cluster unit sends data from its enabled interface to the first interface of first network device. First cluster unit can be configured to process each request of first network device and can keep a log of every session involving the first network device.

At step 408, the method and network system checks for whether first cluster unit has failed or if the first cluster is not able to process, transmit, or receive traffic from or to the external network. A cluster unit can fail due to one or more of heavy computational data load, hardware defects, loss of bandwidth carrying data, change in network configuration, change in network settings, failure of TCP/IP connection, among other such reasons. If it is detected that the first cluster unit has not failed and is operational, active connection continues to be used between first cluster unit and first network device and the method goes back to step 406. If, on the other hand, failure of first cluster unit is detected, the method proceeds to the failover procedure and moves on to step 410.

At step 410, disabled interface of second cluster unit is enabled and backup connection between second interface of first network device and newly enabled interface of second cluster unit is activated for transmitting traffic between first network device and external network. As sessions between first and second cluster units are interchanged and shared consistently, second cluster unit can start processing and transmitting data of first network device to the external network immediately after the switching from first to second cluster unit. Furthermore, for smooth transition without any data loss, enabled interface of first cluster unit and disabled interface of second cluster unit can share a single virtual internet protocol (IP) address and a single virtual media access control (MAC) address so that data transmission can takes place without any ambiguity or conflicts.

At step 412, after enabling the backup connection between first network device and second cluster unit, enabled interface of first cluster unit is disabled. Once the first cluster unit fails and no data transfer can be done from first cluster unit to external network, active connection with first network device does not exist anymore and all data transfer of first network device is done from newly enabled interface of second cluster unit, enabled interface of first cluster unit can be disabled such that no traffic can be passed from first network device to first cluster unit over disabled connection.

At step 414, the system and method can be configured to check whether first cluster unit is operational and is able to establish connection with external network. If the first cluster unit is operational, switching takes place from second unit to first cluster unit and active connection is re-established or renewed between first network device and first cluster unit and the process moves to step 406. In this process, interface of second cluster unit that is responsible for backup connection is disabled and traffic flow for first network device takes place through first cluster unit. On the other hand, if first cluster unit is not operational, the method moves on to step 416, wherein first network device continues to access external network through newly enabled interface of backup connection of second cluster unit.

As mentioned above, although the present disclosure has been made with respect to two network devices using two cluster units as their respective active and backup connections, according to one embodiment, one network device can be used for with two cluster units, with one cluster unit having an active connection with the network device and the other having a backup connection.

At step 452, an active connection can be established between a first interface of a second network device within an internal network and an enabled interface of second cluster unit of high-availability (HA) cluster.

At step 454, a backup connection is established between a second interface of second network device and disabled interface of first cluster unit of the HA cluster. Being a backup connection, any traffic coming from or to the second network device would not be routed through first cluster unit unless second cluster unit fails or is not able to establish relationship with external network. In operation, runtime information of second network device can be synchronized by the second cluster unit with first cluster unit having backup connection.

At step 456, second network device continues to use active connection with second cluster unit for receiving and processing traffic originated by the device for transmission onto external network. Enabled interface of second cluster unit can start receiving traffic from first interface of second network device and process data of second network device. Similarly, second cluster unit sends data from its enabled interface to the first interface of second network device. Second cluster unit can be configured to process each request of second network device and can keep a log of every session involving the second network device.

At step 458, the method and network system checks for whether second cluster unit has failed or if the second cluster unit is not able to process, transmit, or receive traffic from or to the external network. If it is detected that second cluster unit has not failed and is operational, active connection continues to be used between second cluster unit and second network device and the method goes back to step 456. If, on the other hand, failure of second cluster unit is detected, the method proceeds to the failover procedure and moves on to step 460.

At step 460, disabled interface of first cluster unit is enabled and backup connection between second network device and newly enabled interface of first cluster unit is activated for transmitting traffic between second network device and external network. As sessions between first and second cluster units are interchanged and shared consistently, first cluster unit can start processing and transmitting data of second network device to the external network immediately after the switching from second to first cluster unit. Furthermore, for smooth transition without any data loss, enabled interface of second cluster unit and disabled interface of first cluster unit can share a single virtual internet protocol (IP) address and a single virtual media access control (MAC) address so that data transmission can takes place without any ambiguity or conflicts.

At step 462, after enabling the backup connection between second network device and first cluster unit, enabled interface of second cluster unit is disabled. Once the second cluster unit fails and no data transfer can be done from second cluster unit to external network, active connection with second network device does not exist anymore and all data transfer of first network device is done from newly enabled interface of first cluster unit, enabled interface of second cluster unit can be disabled such that no traffic can be passed from second network device to second cluster unit over disabled connection.

At step 464, the system and method can be configured to check whether second cluster unit is operational and is able to establish connection with external network. If the second cluster unit is operational, switching takes place from first unit to second cluster unit and active connection is re-established or renewed between second network device and second cluster unit and the process moves to step 456. In this process, interface of first cluster unit that is responsible for backup connection is disabled and traffic flow for second network device takes place through second cluster unit. On the other hand, if second cluster unit is not operational, the method moves on to step 466, wherein second network device continues to access external network through newly enabled interface of backup connection of first cluster unit.

The following process can be carried out by a plurality of cluster units of HA cluster, wherein each cluster unit can be determined as active and backup connections for multiple network devices or can be connected to a single network device to act either as its backup or active connection. Multiple interfaces for each cluster unit allow the unit to act as active or backup connection for multiple network devices, allowing flexibility in load balancing. Likewise, multiple interfaces of network devices also allow each network device to have multiple active or backup connections. For instance, in case a network device has 5 interfaces/ports, one interface can be connected with an enabled interface of cluster unit 1, and other four interfaces can be connected to disabled interfaces of cluster units 2-4 for having a backup connection.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method comprising:

establishing an active connection between a first interface of a network device within an internal network and a first interface of a first cluster unit of a high-availability (HA) cluster of network security devices, wherein the first interface of the first cluster unit is in an enabled state in which network traffic directed thereto is able to be received, wherein the HA cluster provides the internal network with connectivity to an external network;

concurrent with the active connection, establishing a backup connection between a second interface of the network device and a first interface of a second cluster unit of the HA cluster, wherein the first interface of the second cluster unit is in a disabled state in which network traffic directed thereto is not able to be received and wherein the first interface of the first cluster unit and the first interface of the second cluster unit share a first virtual Internet Protocol (IP) address;

while the first cluster unit remains in an operational state and has connectivity to the external network, receiving and processing, by the first cluster unit via the active connection, network traffic from the network device that is to be transmitted onto the external network; and upon determining the first cluster unit is in a failed state or the first cluster unit does not have connectivity to the external network, then, causing subsequent network traffic from the network device that is to be transmitted onto the external network to be received and processed by the second cluster unit via the backup connection by putting the first interface of the second cluster unit into the enabled state and putting the first interface of the first cluster unit into the disabled state.

2. The method of claim 1, further comprising:
establishing a second active connection between a first interface of a second network device within the internal network and a second interface of the second cluster unit, wherein the second interface of the second cluster unit is in the enabled state;
concurrently with the second active connection, establishing a second backup connection between a second interface of the second network device and a second interface of the first cluster unit, wherein the second interface of the first cluster unit is in the disabled state;
while the second cluster unit remains in an operational state and its link to the external network is operational, receiving and processing, by the second cluster unit via the second active connection, all network traffic from the second network device that is to be transmitted onto the external network; and
when the second cluster unit is in a failed state or its link to the external network has failed, then causing all subsequent network traffic from the second network device that is to be transmitted onto the external network to be received and processed by the first cluster unit via the second backup connection by putting the second interface of the first cluster unit into the enabled state and putting the second interface of the second cluster unit into the disabled state.

3. The method of claim 2, wherein the second interface of the first cluster unit and the second interface of the second cluster unit share a second virtual Internet Protocol (IP) address.

4. The method of claim 2, wherein the second interface of the first cluster unit and the second interface of the second cluster unit share a second virtual Media Access Control (MAC) address.

5. The method of claim 1, wherein the network device comprises a router, an access point, a hub, a switch or a client computing device.

6. The method of claim 1, further comprising synchronizing runtime information between the first cluster unit and the second cluster unit via one or more HA links coupling the first cluster unit and the second cluster unit.

7. The method of claim 6, further comprising electing the first cluster unit as a configuration master unit and causing configuration settings of the second cluster unit to be synchronized with configuration settings of the first cluster unit via the one or more HA links.

8. The method of claim 1, wherein the first interface of the first cluster unit and the first interface of the second cluster unit share a first virtual Media Access Control (MAC) address.

9. The method of claim 1, wherein the high-availability (HA) cluster of network security devices consists essentially of the first cluster unit and the second cluster unit.

10. A system comprising:
a plurality of network devices coupled to an internal network; and
a plurality of cluster units configured as part of a high-availability (HA) cluster of network security devices and providing the internal network with connectivity to an external network, wherein the system is configured to perform a method comprising:
establishing an active connection between a first interface of a network device of the plurality of network devices and a first interface of a first cluster unit of the plurality of cluster units, wherein the first interface of the first cluster unit is in an enabled state in which network traffic directed thereto is able to be received;
establishing a backup connection between a second interface of the network device and a first interface of a second cluster unit of the plurality of cluster units, wherein the first interface of the second cluster unit is in a disabled state in which network traffic directed thereto is not able to be received and wherein the first interface of the first cluster unit and the first interface of the second cluster unit share a first virtual Internet Protocol (IP) address;
while the first cluster unit remains in an operational state and has connectivity to the external network, receiving and processing, by the first cluster unit via the active connection, network traffic from the network device that is to be transmitted onto the external network; and
upon determining the first cluster unit is in a failed state or the first cluster unit does not have connectivity to the external network, then, causing subsequent network traffic from the network device that is to be transmitted onto the external network to be received and processed by the second cluster unit via the backup connection by putting the first interface of the second cluster unit into the enabled state and putting the first interface of the first cluster unit into the disabled state.

11. The system of claim 10, wherein the method further comprises:
establishing a second active connection between a first interface of a second network device of the plurality of network devices and a second interface of the second cluster unit, wherein the second interface of the second cluster unit is in the enabled state;
concurrently with the second active connection, establishing a second backup connection between a second interface of the second network device and a second interface of the first cluster unit, wherein the second interface of the first cluster unit is in the disabled state;
while the second cluster unit remains in an operational state and has connectivity to the external network, receiving and processing, by the second cluster unit via the second active connection, all network traffic from the second network device that is to be transmitted onto the external network; and
upon determining the second cluster unit is in a failed state or the second cluster unit does not have connectivity to the external network, then causing all subsequent network traffic from the second network device that is to be transmitted onto the external network to be received and processed by the first cluster unit via the second backup connection by putting the second interface of the first cluster unit into the enabled state and putting the second interface of the second cluster unit into the disabled state.

12. The system of claim 11, wherein the second interface of the first cluster unit and the second interface of the second cluster unit share a second virtual Internet Protocol (IP) address.

13. The system of claim 11, wherein the second interface of the first cluster unit and the second interface of the second cluster unit share a second virtual Media Access Control (MAC) address.

14. The system of claim 10, wherein the network device comprises a router, an access point, a hub, a switch or a client computing device.

15. The system of claim 10, wherein the method further comprises synchronizing runtime information between the first cluster unit and the second cluster unit via one or more HA links coupling the first cluster unit and the second cluster unit.

16. The system of claim 10, wherein the method further comprises electing one cluster unit from the plurality of cluster units as a configuration master unit and causing configuration settings of other of the plurality of cluster units to be synchronized with configuration settings of the configuration master.

17. The system of claim 10, wherein the first interface of the first cluster unit and the first interface of the second cluster unit share a first virtual Media Access Control (MAC) address.

18. The system of claim 10, wherein the plurality of cluster units consist essentially of the first cluster unit and the second cluster unit.

* * * * *